(12) United States Patent
Lin

(10) Patent No.: US 10,394,039 B2
(45) Date of Patent: Aug. 27, 2019

(54) APPARATUS AND METHODS FOR REDUCING BLUE LIGHT HAZARDS

(71) Applicant: Po-Kang Lin, Taipei (TW)

(72) Inventor: Po-Kang Lin, Taipei (TW)

( * ) Notice: Subject to any disclaimer, the term of this patent is extended or adjusted under 35 U.S.C. 154(b) by 550 days.

(21) Appl. No.: 14/995,229

(22) Filed: Jan. 14, 2016

(65) Prior Publication Data

US 2017/0205635 A1   Jul. 20, 2017

(51) Int. Cl.
*G02B 27/28* (2006.01)
*G02B 26/02* (2006.01)
*H05B 37/02* (2006.01)
*H05B 33/08* (2006.01)

(52) U.S. Cl.
CPC ......... *G02B 27/281* (2013.01); *G02B 26/023* (2013.01); *H05B 33/0815* (2013.01); *H05B 37/0281* (2013.01); *Y02B 20/42* (2013.01)

(58) Field of Classification Search
CPC ................ G02B 27/281; G02B 26/023; H05B 33/0815; H05B 37/0281; Y02B 20/42
USPC .......................................................... 362/19
See application file for complete search history.

(56) References Cited

U.S. PATENT DOCUMENTS

| 7,878,661 | B2 * | 2/2011 | Hsu | ........................ | G03B 21/16 353/31 |
| 2004/0227989 | A1 * | 11/2004 | Obrebski | ........... | G02B 21/0012 359/388 |
| 2015/0003035 | A1 * | 1/2015 | Li | ........................ | G02B 6/0015 362/19 |

* cited by examiner

*Primary Examiner* — Bao Q Truong
*Assistant Examiner* — Jessica M Apenteng
(74) *Attorney, Agent, or Firm* — Lin & Associates Intellectual Property, Inc.

(57) ABSTRACT

The present invention provides an apparatus for reducing blue light hazard, including: a blue light source and a control module. The control module regulates the blue light source to emit a blue intermittent illumination in a fixed frequency, and a user who looks into the blue light source may perceive visual persistence effect via the blue intermittent illumination. On the other hand, the present invention also provides apparatus for reducing blue light hazard that utilizes a polarizer or a phase adjusting device. Further, various methods for reducing blue light hazard are also provided.

1 Claim, 8 Drawing Sheets

APPARATUS AND METHODS FOR REDUCING BLUE LIGHT HAZARDS

BACKGROUND OF THE INVENTION

1. Field of the Invention

The present invention relates to apparatus and methods for reducing blue light hazards, and more particularly, relates to apparatus and methods that reduce blue light hazards utilizing visual persistence effect, polarization of light and phase of light.

2. The Prior Arts

As technology advances, 3C products such as smart mobile devices and tablet computers nearly become necessities for each citizen. Not only are these 3C products used during commute, in the meetings and during break times, but they are also often used in bed right before a user goes to sleep in a dimly lit environment. Thus, each citizen may end up spending hours on these devices every day.

The visible light emitted by smart mobile devices or tablet computers are considered as strong light, and such visible light may include various colors such as the white, red, orange, yellow, green, blue, indigo and purple visible light. FIG. 1a is a schematic diagram illustrating the spectrum of white light. As shown in FIG. 1a, the spectrum of white light can be categorized into a waveform a and a waveform b. The blue light wavelength in the waveform a is at 450 nm, and the blue light wavelength in the waveform b is at 462 nm. From the graph, it can be seen that the intensity of blue light in the white light are at their peaks in both waveform a and waveform b. Therefore, it is clear that the blue light has the strongest effect on human eyes amongst all colors of visible light.

FIG. 1b is a schematic diagram illustrating the relationship between time and the intensity of blue light of 3C products. As shown in FIG. 1b, once conventional 3C products are turned on, these products will continue to emit blue light until they are turned off again. Images and color are formed when the visible light emitted by 3C products enters the macula area of a human eye ball, thereby generating visions. However, blue light, indigo light and purple light are the types of visible light with stronger energy. These lights will pass through cornea and crystal body to enter macula area directly, thereby damaging the photoreceptor cells in the macula area. Age-related macular degeneration is a medical condition developed as a patient ages. When a user looks into a 3C product screen for a long period of time, the chronicle irritation caused by such action could lead to inflammation and swelling of the macula area, and could further lead to the formation of drusen in the center of the macula area. If any of the drusen ruptures and starts to bleed, it could compromise the vision at the central part of a patient's view range. This condition may prevent the patient from looking directly to the front to see and end up squinting; in the end, this condition could result in the patient losing his vision.

Another reason for the blue light being hazardous to the eye is its short wavelength. Blue light is easily scattered because of such short wavelength; as a result, it requires a greater effort for human eyes to focus. Consequently, ciliary muscle is tensed up and unable to relax, and the user may easily experience fatigue and soreness in the eyes when looking into the blue light. Pseudomyopia is another possible hazardous outcome of such situation. If ciliary muscle is unable to relax properly for a long period of time, pseudomyopia may actually develop into myopia, and the degree of myopia may start to increase.

Due to the above drawbacks of 3C products regarding blue light hazard, there is a need for the industry to develop an apparatus and method that is capable of effectively reducing such blue light hazard.

SUMMARY OF THE INVENTION

Based on the above reasons, a primary objective of the present invention is to provide an apparatus for reducing blue light hazard, including: a blue light source and a control module. The control module regulates the blue light source to emit a blue intermittent illumination in a fixed frequency, and a user who looks into the blue light source may perceive visual persistence effect via the blue intermittent illumination.

The apparatus of the present invention further includes a red light source and a green light source. The control module regulates the red light source and the green light source to respectively emit a red intermittent illumination and a green intermittent illumination in the fixed frequency. The blue intermittent illumination, the red intermittent illumination and the green intermittent illumination are radiated in a cycle to generate a white intermittent illumination. The user who looks into the blue light source, the red light source and the green light source perceives visual persistence effect via the white intermittent illumination, thereby lowering any hazardous effects that are harmful to human eyes caused by the blue light.

According to an embodiment of the present invention, the fixed frequency is between $1/30$ to $1/15$ seconds.

In another aspect of the present invention, an apparatus for reducing blue light hazard is provided, including: a white light source, a control module; and a rotatable polarizer. The control module controls the polarizer to rotate in a fixed frequency, and an angle of a blue light beam in the white light is adjusted by the polarizer that is being rotated.

According to an embodiment of the present invention, the fixed frequency is between $1/30$ to $1/15$ seconds.

In a further aspect of the present invention, an apparatus for reducing blue light hazard is provided, including: a white light source having a phase and a phase adjusting device. The phase adjusting device expands the phase of the white light source, so a blue light phase in the white light source is also expanded.

According to one aspect of the present invention, a method for reducing blue light hazard is provided, including: emitting a blue intermittent illumination with a fixed frequency via a blue light source; and giving visual persistence effect to a user who looks into the blue light source via the blue intermittent illumination.

The method for reducing blue light hazard further includes: emitting a red intermittent illumination via a red light source and emitting a green intermittent illumination via a green light source; radiating the blue intermittent illumination, the red intermittent illumination and the green intermittent illumination in a cycle to generate a white intermittent illumination; and via the white intermittent illumination, giving visual persistence effect to the user who looks into the blue light source, the red light source and the green light source.

According to an embodiment of the present invention, the fixed frequency is between $1/30$ to $1/15$ seconds.

In another aspect of the present invention, a method for reducing blue light hazard is provided, including: controlling a polarizer to rotate in a fixed frequency via a control module; and adjusting an angle of a blue light beam of the white light source via the rotating polarizer.

According to an embodiment of the present invention, the fixed frequency is between 1/30 to 1/15 seconds.

The present invention further provides another method for reducing blue light hazard, including: expanding a phase of a white light source via a phase adjusting device; and expanding a blue light phase in the white light source.

Other purposes, advantages and innovative features of the present invention will be apparent to those skilled in the art by reading the following examples with reference to the appended drawings.

BRIEF DESCRIPTION OF THE DRAWINGS

The preferred embodiments of the present invention and the summary described above will be apparent to those skilled in the art by reading the detailed description in the following section, with reference to the attached drawings. For the purpose of illustration, each drawing is drawn according to the preferred embodiments of the present invention; however, it should be understood that the present invention is not limited to the exact configuration and device shown in the drawings.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1A:
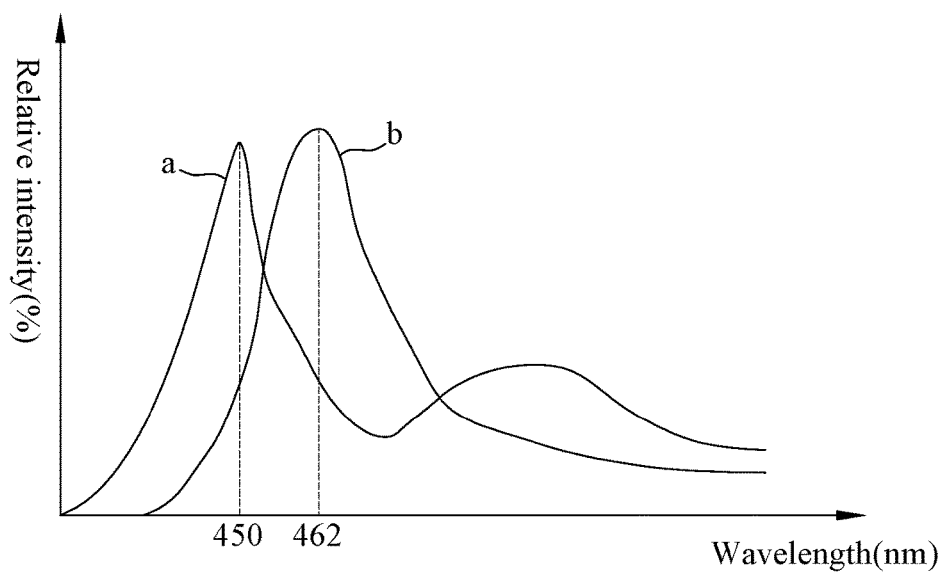
FIG. 1a is a block diagram illustrating the spectrum of white light.
Figure 1B:
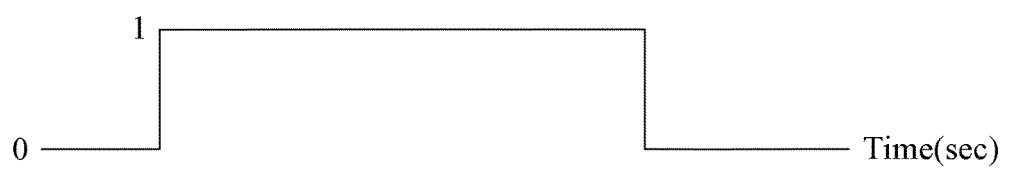
FIG. 1b is a schematic graph illustrating the relationship between time and the intensity of the blue light of 3C products.
Figure 2A:
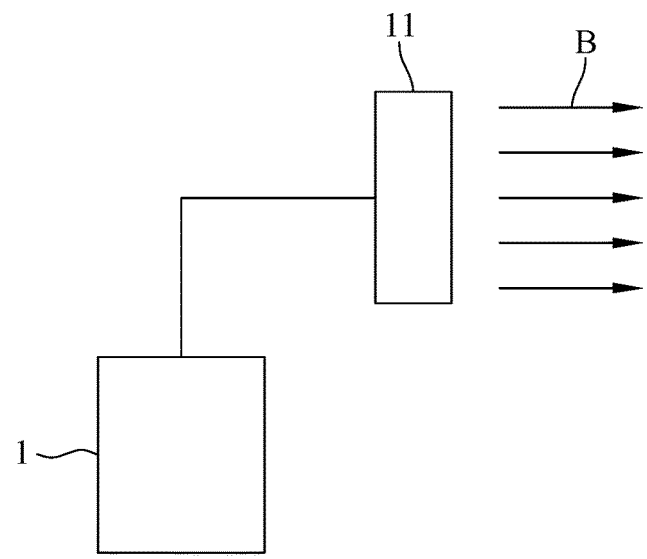
FIG. 2a is a block diagram illustrating the configuration of an apparatus for reducing blue light hazard according to a first embodiment of the present invention.
Figure 2B:
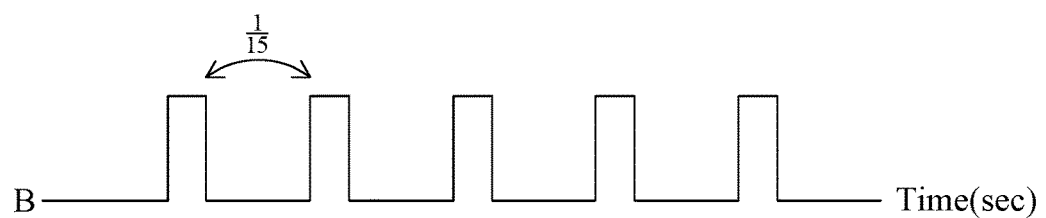
FIG. 2b is a schematic graph illustrating the radiation frequency of blue intermittent illumination in the first embodiment of the present invention.

FIG. 2a is a block diagram illustrating the configuration of an apparatus for reducing blue light hazard according to a first embodiment of the present invention. FIG. 2b is a schematic graph showing the radiation frequency of blue intermittent illumination in the first embodiment of the present invention. As shown in FIG. 2a and FIG. 2b, the apparatus for reducing blue light hazard according to the first embodiment of the present invention includes a blue light source 11 and a control module 1. The control module 1 regulates the blue light source 11 to emit a blue intermittent illumination B in a fixed frequency. In the first embodiment of the present invention, the blue light source 11 functions at the frequency of 1/15 seconds. In other words, the control module 1 regulates the blue light source 11 to emit a blue intermittent illumination B once every 1/15 seconds.

When an intermittent illumination enters a human eye, the receiver will perceive a vision persistence effect. If the frequency of intermittent illumination is controlled at 1/15 seconds, human eyes will automatically choose to ignore the blank period during these 1/15 seconds and will fill up the time period with the effect of vision persistence. Therefore, when a user looks directly into the blue light source 11 and perceives a vision persistence effect via the blue intermittent illumination, his/her eyes are not irritated by the blue light as much as other conventional blue light source; as a result, the blue light source 11 is capable of effectively reducing the hazardous effects of blue light that are harmful to human eyes. It should be noted that even though the fixed frequency is controlled at 1/15 seconds in the first embodiment of the present invention, the fixed frequency can any other number within the range between 1/30 seconds to 1/15 seconds in other embodiments.

Figure 3A:
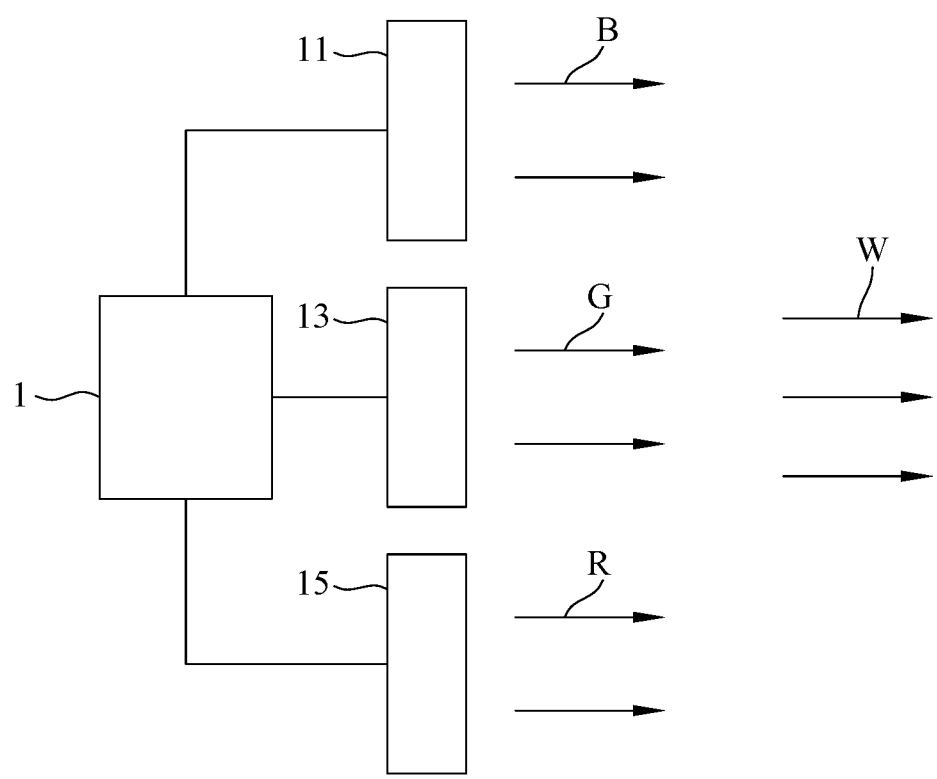
FIG. 3a is a block diagram illustrating the configuration of an apparatus for reducing blue light hazard according to a second embodiment of the present invention.
Figure 3B:
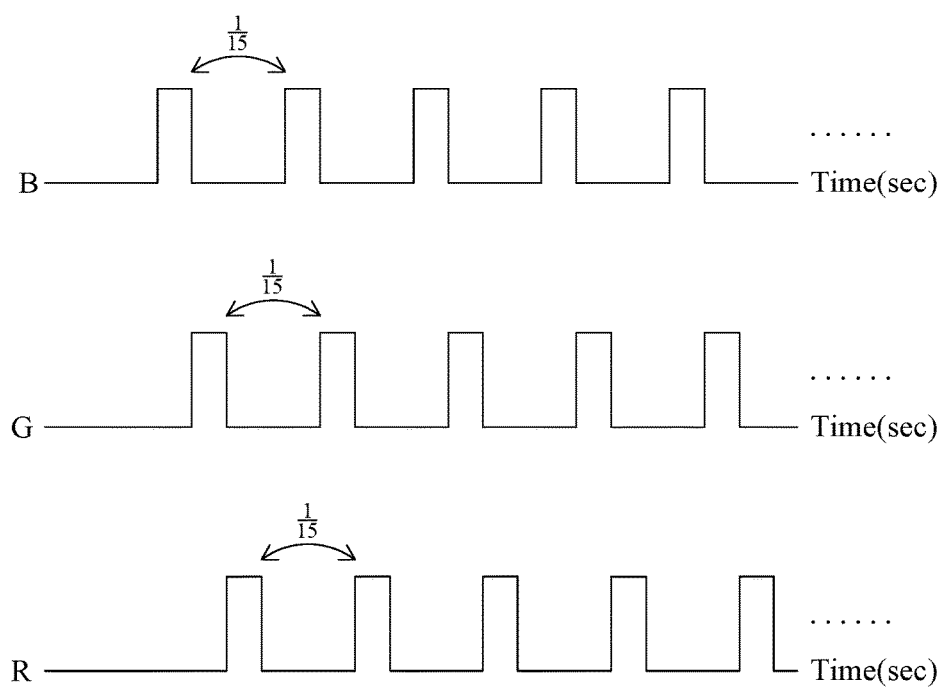
FIG. 3b is a schematic graph illustrating the radiation frequency of blue intermittent illumination, green intermittent illumination and red intermittent illumination in the second embodiment of the present invention.

FIG. 3a is a block diagram illustrating the configuration of an apparatus for reducing blue light hazard according to a second embodiment of the present invention. FIG. 3b is a schematic graph showing the radiation frequency of blue intermittent illumination, green intermittent illumination and red intermittent illumination in the second embodiment of the present invention. As shown in FIG. 3a and FIG. 3b, the apparatus for reducing blue light hazard according to the second embodiment of the present invention includes a blue light source 11, a green light source 13, a red light source 15 and a control module 1. The control module 1 regulates the blue light source 11, green light source 13 and red light source 15 to respectively emit a blue intermittent illumination B, a green intermittent illumination G and a red intermittent illumination R. The blue light source 11, the green light source 13 and the red light source all function at a frequency of 1/15 seconds. Blue intermittent illumination B, green intermittent illumination G and red intermittent illumination R are radiated in a cycle to generate a white intermittent illumination W. In other words, the control module 1 controls the blue light source 11, the green light source 13 and the red light source 15 to respectively emit a blue intermittent illumination B, a red intermittent illumination R and a green intermittent illumination G every 1/15 seconds, and blue intermittent illumination B, green intermittent illumination G and red intermittent illumination R are radiated in a cycle to generate the white intermittent illumination W.

When an intermittent illumination enters a human eye, the receiver will perceive a vision persistence effect. If the frequency of intermittent illumination is controlled at 1/15 seconds, human eyes will automatically choose to ignore the blank period during these 1/15 seconds and will fill up the time period with the effect of vision persistence. Therefore, when a user looks directly into the blue light source 11, green light source 13 and red light source 15 and perceives a vision persistence effect via the blue intermittent illumination B, the red intermittent illumination R and the green intermittent illumination G, his/her eyes are not irritated by the blue light as much as other conventional light source; as a result, the blue light source 11 is capable of effectively reducing the hazardous effects that are harmful to human eyes. It should be noted that even though the fixed frequency is controlled at 1/15 seconds in the second embodiment of the present invention, the fixed frequency can be set at any number within the range between 1/30 seconds to 1/15 seconds in other embodiments.

Figure 4:
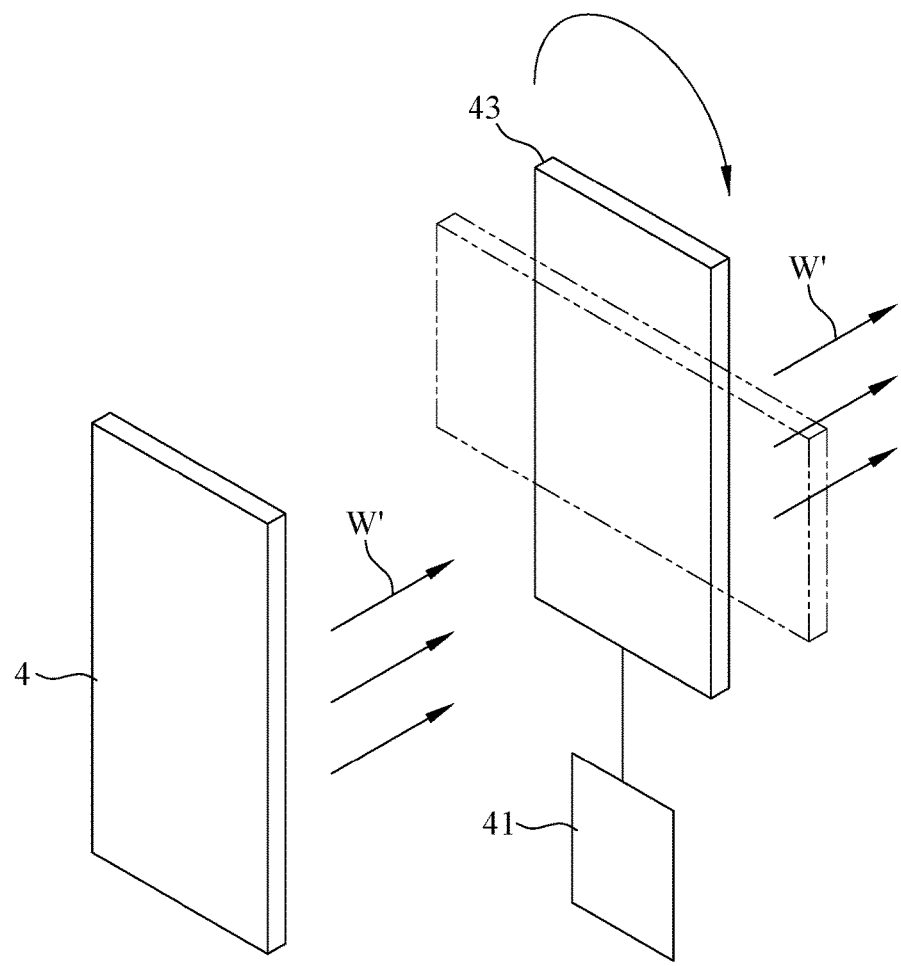
FIG. 4 is a schematic view illustrating the configuration of an apparatus for reducing blue light hazard according to a third embodiment of the present invention.

FIG. 4 is a schematic view illustrating an apparatus for reducing blue light hazard according to a third embodiment of the present invention. As shown in FIG. 4, the apparatus for reducing blue light hazard according to the third embodiment of the present invention includes: a white light source 4, a control module 41 and a polarizer 43. The polarizer 43 is rotatable and is configured to adjust an angle of the blue light. When the apparatus is in operation, the control module 41 controls the polarizer 43 to rotate in a fixed frequency. The white light source 4 adjusts an angle of a blue light beam in the white light W', which is emitted by the white light source 4, via the rotating polarizer 43. In such a way, the hazardous effect of the blue light in the white light source 4 is reduced.

In the third embodiment, the fixed frequency is set at 1/15 seconds. In other words, the control module 41 controls the polarizer 43 to rotate for a revolution once every 1/15 seconds, so that the angle of blue light beam from the white light source 4 is changed once every 1/15 seconds. Human eyes will automatically choose to ignore the blank period during these 1/15 seconds and will fill up the time period with the effect of vision persistence. Therefore, when a user looks directly into the white light source 4 and perceives a vision persistence effect via the rotation of the polarizer 43, his/her eyes are not irritated by the blue light in the white light source 4 as much as other conventional blue light sources; as a result, the white light source 4 is capable of effectively reducing the hazardous effects of blue light that are harmful to human eyes. It should be noted that even though the fixed frequency is controlled at 1/15 seconds in the third embodiment of the present invention, the fixed frequency can be controlled at any number within the range between 1/30 seconds to 1/15 seconds in other embodiments.

Figure 5:
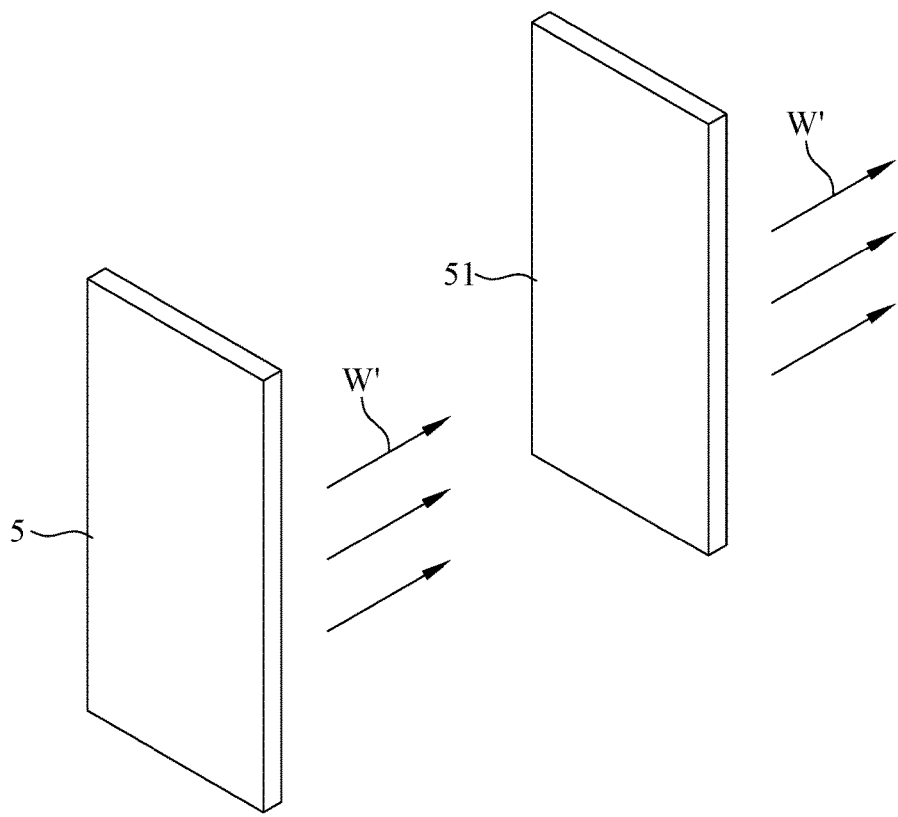
FIG. 5 is a schematic view illustrating the configuration of an apparatus for reducing blue light hazard according to a fourth embodiment of the present invention.

FIG. 5 is a schematic view illustrating the configuration of an apparatus for reducing blue light hazard according to a fourth embodiment of the present invention. As shown in FIG. 5, the apparatus for reducing blue light hazard according to the fourth embodiment of the present invention includes a white light source 5 and a phase adjusting device 51. The white light source 5 has a phase. A light phase is defined by the alternating variations in a waveform, which is caused by the photon vibration while a light wave moves forward. Because light is an electromagnetic wave, and photon vibration is perpendicular to both magnetic vibration and the direction of wave propagation, the phase of light is changed when the waveform changes during the propagation process, and so is the wavelength and the amplitude. Thus, it can be known that the waveform of the white light W' is determined by the phase of light. In the fourth embodiment of the present invention, the phase of the white light source 5 is expanded by the phase adjusting device 51, so a blue light phase in the white light source 5 is also expanded. In such a way, the hazardous effects of the blue light in the white light source 5 that are harmful to human eyes are reduced.

Figure 6:
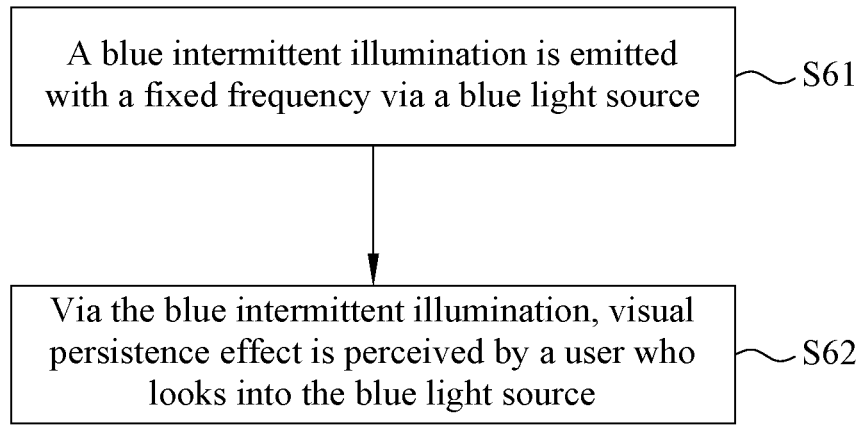
FIG. 6 is a flow diagram showing the steps of a method for reducing blue light hazard according to the first embodiment of the present invention.

The present invention also provides a method for reducing blue light hazard. FIG. 6 is a flow chart showing the steps of the method for reducing blue light hazard according to the first embodiment of the present invention. As shown in FIG. 6, the method for reducing blue light hazard according to the first embodiment of the present invention includes steps S61-S62. In step S61, a blue intermittent illumination is emitted with a fixed frequency via a blue light source. In step S62, via the blue intermittent illumination, visual persistence effect is perceived by a user who looks into the blue light source, thereby reducing the hazardous effects of the blue light source that are harmful to human eyes. It should be noted that even though the fixed frequency is set at 1/15 seconds in the first embodiment of the present invention, the fixed frequency can be any number within the range between 1/30 seconds to 1/15 seconds in other embodiments.

Figure 7:
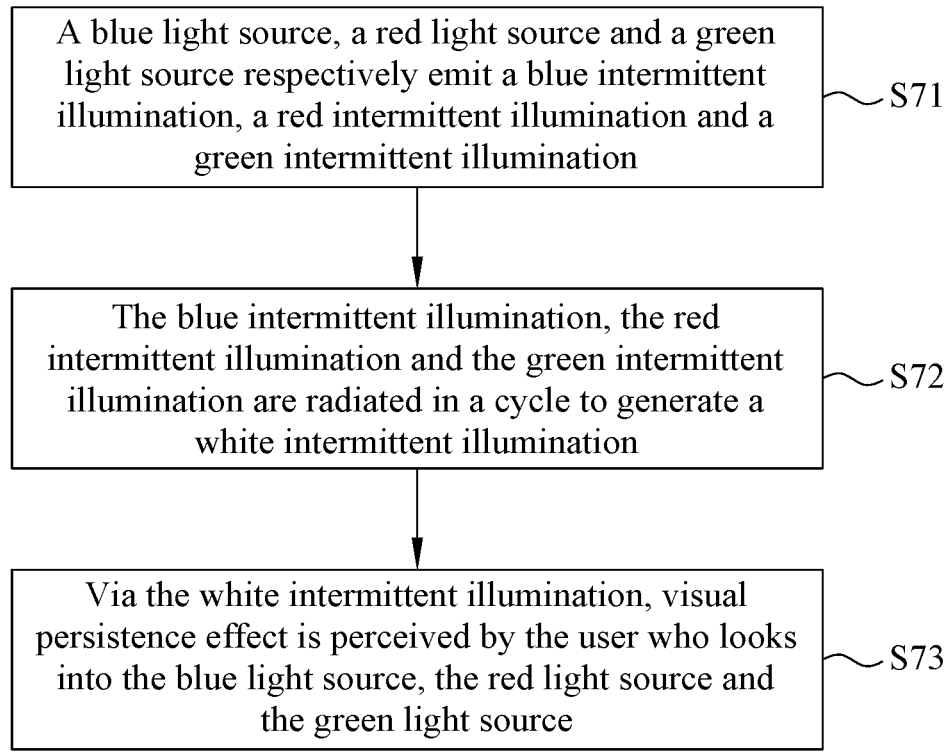
FIG. 7 is a flow diagram showing the steps of a method for reducing blue light hazard according to the second embodiment of the present invention.

FIG. 7 is a flow diagram illustrating a method for reducing blue light hazard according to the second embodiment of the present invention. As shown in FIG. 7, the method for reducing blue light hazard according to the second embodiment of the present invention includes steps S71-S73. In step S71, a blue light source, a red light source and a green light source respectively emit a blue intermittent illumination, a red intermittent illumination and a green intermittent illumination. In step S72, the blue intermittent illumination, the red intermittent illumination and the green intermittent illumination are radiated in a cycle to generate a white intermittent illumination. Lastly, in step S73, via the white intermittent illumination, visual persistence effect is perceived by the user who looks into the blue light source, the red light source and the green light source. It should be noted that even though the fixed frequency is set at 1/15 seconds in the second embodiment of the present invention, the fixed frequency can be any number within the range between 1/30 seconds to 1/15 seconds in other embodiments.

Figure 8:
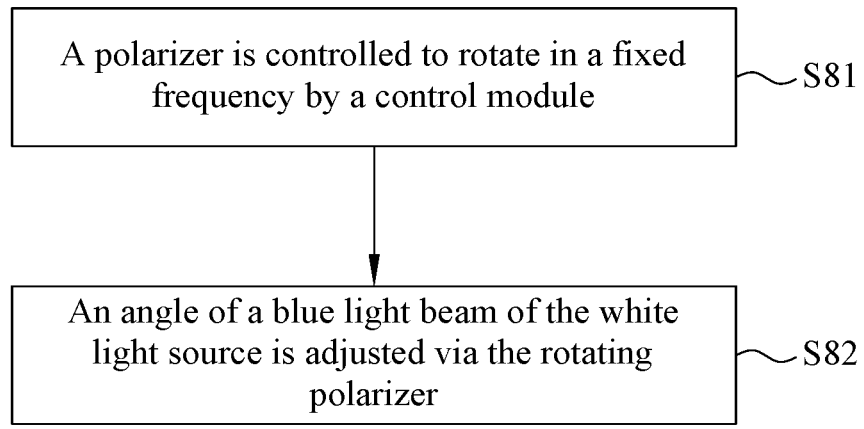
FIG. 8 is a flow diagram showing the steps of a method for reducing blue light hazard according to the third embodiment of the present invention.

FIG. 8 is a flow diagram showing the steps of a method for reducing blue light hazard according to the third embodiment of the present invention. As shown in FIG. 8, the method for reducing blue light hazard according to the third embodiment of the present invention includes steps S81-S82. In step 81, a polarizer is controlled to rotate in a fixed frequency by a control module. In step 82, an angle of a blue light beam of the white light source is adjusted via the rotating polarizer, so the hazardous effects of the blue light in the white light, which are harmful to human eyes, may be reduced. It should be noted that even though the fixed frequency is set at 1/15 seconds in the third embodiment of the present invention, the fixed frequency can be set any number within the range between 1/30 seconds to 1/15 seconds in other embodiments.

Figure 9:
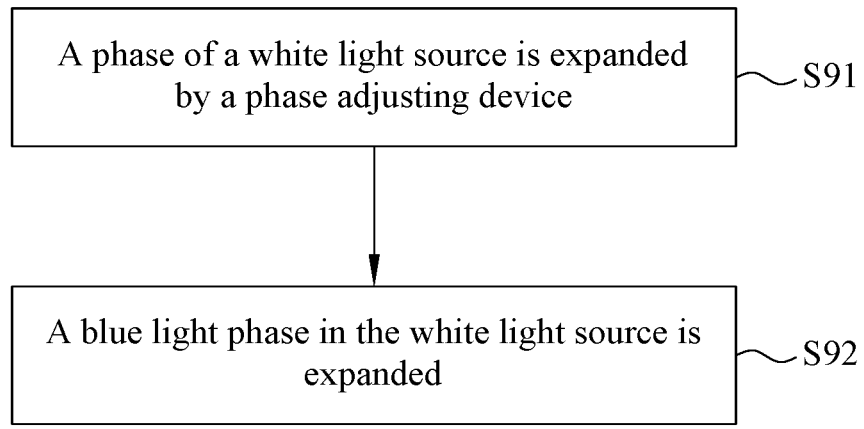
FIG. 9 is a flow diagram showing the steps of a method for reducing blue light hazard according to the fourth embodiment of the present invention

FIG. 9 is a flow diagram showing the steps of a method for reducing blue light hazard according to the fourth embodiment of the present invention. As shown in FIG. 9, the method for reducing blue light hazard according to the fourth embodiment of the present invention includes steps S91-S92. In step S91, a phase of a white light source is expanded by a phase adjusting device. In step S92, a blue light phase in the white light source is expanded. In such a way, the hazardous effects of the blue light in the white light, which are harmful to human eyes, may be reduced.

The apparatus and methods of the present invention can be applied to various 3C products or may be applied to any day-to-day lighting devices. Regarding extended-period lightings, the present invention is able to effectively reduce the hazardous effects of the blue light, which are harmful to human eyes, utilizing the effect of visual persistence, light polarization and phase expansion while maintaining the perceived intensity of blue light.

Although the operation of the method according to the embodiments of the present invention has been described in a certain order, it is not meant to limit the order of the steps. It should be apparent to those skilled in the art that the method can also be performed in a different order. Therefore, the order of the steps should not be seen as a limitation to the claims of the present invention. In addition, the method in the claims should not be limited by the order of steps described above. Those who are skilled in the art should understand that the order of the steps can be changed without departing from the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An apparatus for reducing blue light, comprising:
   a white light source generating a white light;
   a control module; and
   a polarizer that is rotatable;
   wherein the control module controls the polarizer to rotate in a fixed frequency between 1/30 to 1/5 seconds per cycle, and an angle of a blue light beam from the white light is adjusted by the polarizer that is being rotated to provide an intermittent blue illumination so as to reduce the blue light in the white light.

* * * * *